United States Patent
Fuller et al.

(10) Patent No.: US 7,921,911 B2
(45) Date of Patent: Apr. 12, 2011

(54) SURFACE-MODIFYING AGENTS FOR WETTABILITY MODIFICATION

(75) Inventors: Michael J. Fuller, Houston, TX (US);
Trevor Lloyd Hughes, Cambridge (GB);
Jill F. Geddes, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 197 days.

(21) Appl. No.: 12/346,199

(22) Filed: Dec. 30, 2008

(65) Prior Publication Data

US 2010/0163234 A1    Jul. 1, 2010

(51) Int. Cl.
*E21B 43/04* (2006.01)
*E21B 43/22* (2006.01)
*E21B 43/267* (2006.01)
*E21B 43/27* (2006.01)

(52) U.S. Cl. ............... 166/278; 166/280.1; 166/294; 166/305.1; 166/307; 166/308.2; 507/234; 507/269

(58) Field of Classification Search .................. None
See application file for complete search history.

(56) References Cited

U.S. PATENT DOCUMENTS

| | | | |
|---|---|---|---|
| 4,231,428 A | 11/1980 | Needham et al. | |
| 6,182,759 B1 | 2/2001 | Burger et al. | |
| 2007/0015669 A1 | 1/2007 | Zhang | |
| 2007/0029085 A1 | 2/2007 | Panga et al. | |
| 2007/0039732 A1 | 2/2007 | Dawson et al. | |
| 2007/0158070 A1 | 7/2007 | Endres et al. | |
| 2007/0254814 A1 | 11/2007 | Kotlar | |
| 2010/0018706 A1* | 1/2010 | Fan et al. | 166/271 |

FOREIGN PATENT DOCUMENTS

| | | |
|---|---|---|
| CA | 2 545 563 A1 | 11/2006 |
| WO | 2006077125 | 7/2006 |
| WO | 2006116868 | 11/2006 |
| WO | 2007097975 A2 | 8/2007 |
| WO | 2008004242 A2 | 1/2008 |
| WO | 2008005851 A2 | 1/2008 |
| WO | 2008131540 | 11/2008 |
| WO | 2009076080 | 6/2009 |

OTHER PUBLICATIONS

Jimmie R. Baran Jr., Gary A. Pope, Mukul Sharma, Vishal Bang, Harold C. Linnemeyer, Mohabbat Ahmadi and John D. Skildum; New Developments in Chemical Stimulation of Gas Condensate Wells; Asociacion Colombiana de Ingenieros de Petreleos (Acipet); 2007, pp. 1-4.

\* cited by examiner

*Primary Examiner* — George Suchfield
(74) *Attorney, Agent, or Firm* — Rachel Green; David Cate; Robin Nava (57) ABSTRACT

A method and composition for treating a subterranean formation with a fluid, including forming a fluid including a particulate and an organosilane with the chemical formula $R_nSiX_{4-n}$, wherein n is equal to 1, 2, or 3, R is an organic functional group, and X is a halogen, alkoxy, or acetoxy group, introducing the fluid into a subterranean formation with exposed surfaces, and modifying the wettability of a surface of the particulate or subterranean formation or both. A method and composition for treating a subterranean formation with a fluid including forming a fluid comprising a particulate and an organosilane, introducing the fluid into a subterranean formation with exposed surfaces, and modifying the wettability of the proppant or surfaces or both, wherein the wettability modification degrades.

20 Claims, 5 Drawing Sheets

| R-SIX₃ R= | STRUCTURE | PROPOSED WETTABILITY | CONTACT ANGLE |
|---|---|---|---|
| (UNCOATED GLASS) | | HYDROPHILIC | 23.8 |
| METHYL | $H_3CO-Si(-OCH_3)(-OCH_3)-CH_3$ | HYDROPHOBIC | 89.8 |
| OCTADECYL | $H_3CO-Si(-OCH_3)(-OCH_3)-(CH_2)_{17}CH_3$ | HYDROPHOBIC | 91.1 |
| 1H,1H,2H,2H-PERFLUORODECYL | $H_3CH_2CO-Si(-OCH_2CH_3)(-OCH_2CH_3)-CH_2CH_2(CF_2)_7CF_3$ | HYDROPHOBIC | 93.0 |

FIG. 1

| R-SIX$_3$ R= | STRUCTURE | PROPOSED WETTABILITY | CONTACT ANGLE |
|---|---|---|---|
| (UNCOATED GLASS) | | HYDROPHILIC | 23.8 |
| METHYL | H$_3$CO−Si(−OCH$_3$)(−OCH$_3$)−CH$_3$ | HYDROPHOBIC | 89.8 |
| OCTADECYL | H$_3$CO−Si(−OCH$_3$)(−OCH$_3$)−(CH$_2$)$_{17}$CH$_3$ | HYDROPHOBIC | 91.1 |
| 1H,1H,2H,2H-PERFLUORODECYL | H$_3$CH$_2$CO−Si(−OCH$_2$CH$_3$)(−OCH$_2$CH$_3$)−CH$_2$CH$_2$(CF$_2$)$_7$CF$_3$ | HYDROPHOBIC | 93.0 |

| COATING | | K, PERMEABILITY (D) | C, CONDUCTIVITY (MD*FT) | PACK WIDTH (CM) |
|---|---|---|---|---|
| (UNCOATED REP #1) | HYDROPHILIC | 198 | 3779 | 0.544 |
| (UNCOATED REP #2) | HYDROPHILIC | 212 | 3606 | 0.556 |
| METHOXY-(PEO)-PROPYL | HYDROPHILIC | 201 | 3585 | 0.544 |
| 1H,1H,2H,2H-PERFLUORODECYL | HYDROPHOBIC | 253 | 4150 | 0.500 |

SURFACE-MODIFYING AGENTS FOR WETTABILITY MODIFICATION

TECHNICAL FIELD

The present invention relates generally to stimulating subterranean hydrocarbon reservoirs and injector wells in the oilfield services industry. More specifically, this invention relates to proppant pack cleaning.

BACKGROUND OF THE INVENTION

The statements in this section merely provide background information related to the present disclosure and may not constitute prior art.

Stimulation of subterranean hydrocarbon reservoirs and injector wells are widely carried out in the oilfield services industry. The most common techniques, including matrix acidizing, hydraulic fracturing, acid-fracturing, sand control, enhanced oil-recovery, etc. use aqueous fluids to impact hydrocarbon productivity. However, the majority of the aqueous fluids are executed with little knowledge of or consideration for the wettability (water-wet or oil-wet) or the partial water/oil saturation of the rock being treated. In fact, a large number of impediments to production can be attributed to improper formation-wettability.

Water-blocks often result from increased water-production occurring through any of the well-known water-problem types. Water-blocks in the formation are one of the most well-known formation damage mechanisms that diminish hydrocarbon productivity. However, many water-control and water-block remediation treatments are not designed for long-term formation wettability. Issues of wettability are particularly critical in the porous matrix of sandstone reservoirs, where the pore throat diameters are often very small (<10 µm) and thin water-wet/oil-wet coatings of the formation can constrain those pore throat diameters even further. In matrix acidizing, reactive acid fluids are intended to dissolve damaging mineral deposits or other induced particulate damage that may be, at the time of treatment, oil-wet, leaving the immiscible aqueous acid incapable of contacting a large portion of the damaging minerals. In acidizing fluids, "mutual solvents" are often added to temporarily reduce the interfacial tension between the acid and hydrocarbon; amphiphilic surfactants are often added to the acid to leave the formation water-wet enabling more efficient acid/mineral contact. In hydraulic fracturing, formation-wettability is generally considered less important because a) the exposed formation surface area is greatly increased due to the formation of a large fracture and 2) because the hydraulic fracturing fluid is not needed to dissolve mineral damage, consideration of the wettability of the formation adjacent to the fracture is generally not taken into consideration.

However, a large volume of aqueous fracturing fluid leaks off into the formation through the fracture-faces and as a result of its immiscibility with hydrocarbon can be very slow to return to the surface due to the sandstone being preferentially water-wet. A major failure to achieve expected stimulation from a fracturing treatment is through imbibement of water in the formation and proppant pack that is detrimental to hydrocarbon production. The same types of amphiphilic surfactants that are used in acidizing fluids are often added to fracturing fluids for reduced interfacial tension and wettability modification. However, these same surfactants have been used for many decades in stimulation fluids and their mechanism of action is ill-understood and is rarely tailored to formation or fluid properties. These surfactants have been widely proposed as additives for fracturing fluids that will absorb to solid substrates (such as formation or proppant) rendering those surfaces hydrophobic. Capillary pressure in the matrix or pack treated by these surfactants is impacted by both altered wettability and reduced surface tension after their absorption. However, surfactants do not form a persistent or covalent coating on the surface of the formation or proppant and offer only a temporary modification to the formation wettability. They are often swept from the formation surface with aqueous treatment fluid flowback or with the onset of hydrocarbon production.

Improved methods to resolve wettability issues inside the proppant pack of a fracture generated during a hydraulic fracturing treatment are needed. Though the porosities of propped-fractures are much higher than a sandstone matrix/formation, and issues of wettability are less critical in affecting production through the proppant pack. However, certain properties of the proppant pack and fluid filter-cakes could impact the wettability of the proppant pack. For example, resin-coated proppants are used frequently for proppant-flowback control and are generally oil-wet. However, resin-coated proppants have a number of incompatibilities with a number of carrier fluids due to the polymer coating-chemistry and certain fines that are formed in the manufacturing of the resin-coated proppant.

In general, the understanding of sandstone and other formation wettability has greatly advanced in recent years. However, the identity and chemical properties of additives to affect and control wettability (including the chemistry of surfactant additives to stimulation fluids) has not changed. Methods and compositions to tailor wettability properties are desirable.

SUMMARY OF INVENTION

Some embodiments provide a method and composition for treating a subterranean formation with a fluid, including forming a fluid including a particulate and an organosilane with the chemical formula $R_n SiX_{4-n}$, wherein n is equal to 1, 2, or 3, R is an organic functional group, and X is a halogen, alkoxy, or acetoxy group, introducing the fluid into a subterranean formation with exposed surfaces, and modifying the wettability of a surface of the particulate or subterranean formation or both. Some embodiments provide a method and composition for treating a subterranean formation with a fluid including forming a fluid comprising a particulate and an organosilane, introducing the fluid into a subterranean formation with exposed surfaces, and modifying the wettability of the proppant or surfaces or both, wherein the wettability modification degrades. Some embodiments provide a method and composition for producing hydrocarbon from a subterranean formation, including providing a wellbore in a subterranean formation, forming a fluid including a particulate and an organosilane with the chemical formula $R_n SiX_{4-n}$, wherein n is equal to 1, 2, or 3, R is an organic functional group, and X is a halogen, alkoxy, or acetoxy group, introducing the fluid into the subterranean formation with exposed surfaces, modifying the wettability of a surface of the particulate or the subterranean formation or both, and producing hydrocarbon from the wellbore in the subterranean formation.

DETAILED DESCRIPTION OF THE INVENTION

Methods of forming and applying fluids, slurries, or coatings that include compositions of specific classes of organosilanes may be used to control and tailor the wettability properties of a proppant pack and surrounding surfaces. These classes of organosilanes include a hydrophobic moiety, a hydrophilic moiety, an amphiphilic moiety, or a hydrophobic or hydrophilic group with a terminal reactive functionality or other tailored chemical property or a combination thereof. The length of the alkyl (organic) portion of an organosilane, the concentration of silicon within the organosilane, the presence of a spacer within the organosilane and other factors may influence how the organosilane tailors the hydrophobic or hydrophilic nature of the proppant pack and surfaces and influence the wettability of the system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

It should also be noted that in the development of any such actual embodiment, numerous decisions specific to circumstance must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Four families of organosilanes may be used in subterranean applications to provide tailored fluids or coatings for controlling wettability. These silanes are based on the general chemical formula: $R_nSiX_{4-n}$, where "R" is the organic functionality that will be exposed terminally from the solid (quartz or sand) substrate after reaction, and X may include halogens ($X=Cl^-$, $F^-$, $Br^-$, or $I^-$) or alkoxy groups (a nonexclusive list of examples includes methoxy, ethoxy, or oligo(ethylenegly-col)oxy groups). Alkoxy groups may be slower acting than the halogens. Most often, n is 1 and the resulting additives are trihalo or trialkoxysilanes. N may also be 2 or 3. However, other organosilanes have multiple organic functionalities.

The first group of organosilanes occur when R is a hydrophobic moiety, such as a linear, branched, or polymeric alkane. Hydrophobically modified silanes are well known for imparting a hydrophobic character to $SiO_2$ surfaces. In subterranean applications, this would be considered an "oil-wetting" modification to the surface. Examples of hydrophobic R groups include linear (such as methyl, octyl, octadecyl, etc.), branched (t-butyl, 2-ethylhexyl, etc), or polymeric alkanes. Other hydrophobic alkyl modifications include phenyl, benzyl, tolyl, or other partially-unsaturated alkyl groups. A desirable group of hydrophobic R groups includes partially or fully fluorinated alkyl derivatives. Suitable silanes may include linear alkyl silanes (such as methyltrimethoxysilane, hexyltrimethoxysilane, heptyltrimethoxysilane, and octadecyltrimethoxysilane), alkyl silanes with 2 or less hydrolysable groups (such as propylmethyldimethoxysilane, propyldimethylmethoxysilane, and trimethylmethoxysilane), branched alkyl organosilanes (such as isooctyltrimethoxysilane and cyclohexyltrimethoxysilane), partially unsaturated organosilanes (such as phenylethtrimethoxysilane, benzyltriethoxysilane, and p-tolyltrimethoxysilane), and partially fluorinated organosilanes (such as 1H,1H,2H,2H-perfluorodecyltrimethoxysilane, nonafluorohexyltrimethoxysilane, and 3,3,3-trifluoropropyltrimethoxysilane).

The second group of organosilanes occur when R is a hydrophilically functionality that is generally polar (non-hydrogen-bonding), polar (hydrogen-bonding), hydroxylic, or ionic charged; these groups may include oligo(ethylene glycol) groups, oligo(propylene glycol) groups, polar groups (substitution), or polymers, or polyamide groups. These organosilanes may also include dipodal or polypodal organosilanes (with multiple silane attachments to the surface for each organic group. Examples of polar, non hydrogen-bonding organosilanes may include 2-cyanoethyltrimethoxysilane or Bis[(3-methyldimethoxysilyl)propyl]-polypropylene oxide. Examples of polar hydrogen-bonding organosilanes may include 2-[methoxy(polyethyleneoxy)propyl[-trimethoxysilane and Bis[N,N'-(triethoxysilylpropyl)aminocarbonyl] polyethylene oxide. Examples of hydroxylic organosilanes may include Bis(2-hydroxyethyl)-3-aminopropyltriethoxysilane, N-(3-triethoxysilylpropyl)gluconamide, and N-(triethoxysilylpropyl)-O-polyethylene oxide urethane. Examples of charged hydrophilic organosilanes may include carboxyethylsilanetriol, octadecyldimethyl(3-trimethoxysilylpropyl)ammonium chloride, and 3-trihydroxysilylpropyl-methylphosphonate. The action of these hydrophilically-modified silanes would be to impart a preferential "water-wet" character to the surface.

The third group of silanes includes amphiphilically-modified organosilanes, occurring when R is a diblock modification where a hydrophobic (linear or branched) alkane is attached to a hydrophilic group (including the polar, hydrogen-bonding, hydroxylic, or charged groups as described above, such as oligo(ethylene glycol) and oligo(propylene glycol) groups) through a linkage that breaks or degrades with time at conditions (including temperature) that are experienced downhole (such as through ester, amide, persulfate, or peroxide groups). With a terminal hydrophobe and internal hydrophilic group, a surface treated with this family of additives would be initially oil-wet and would switch to water-wet through degradation of the diblock linkage. The initial oil-wet character of the placed proppant pack is useful for both simplified proppant suspension and for rapid unloading of the aqueous carrier fluid after fracturing (once production from the fracture has begun). The hydrophilic surface character after the degradation reaction should be nearly as hydrophilic or more hydrophilic compared to unmodified proppant surface (which is generally understood as hydrophilic). One proposed degradation of a model degradable-diblock organosilanes is shown below in FIG. 1, though other degradation reactions (such as amide hydrolysis) exist.

Figure 1:
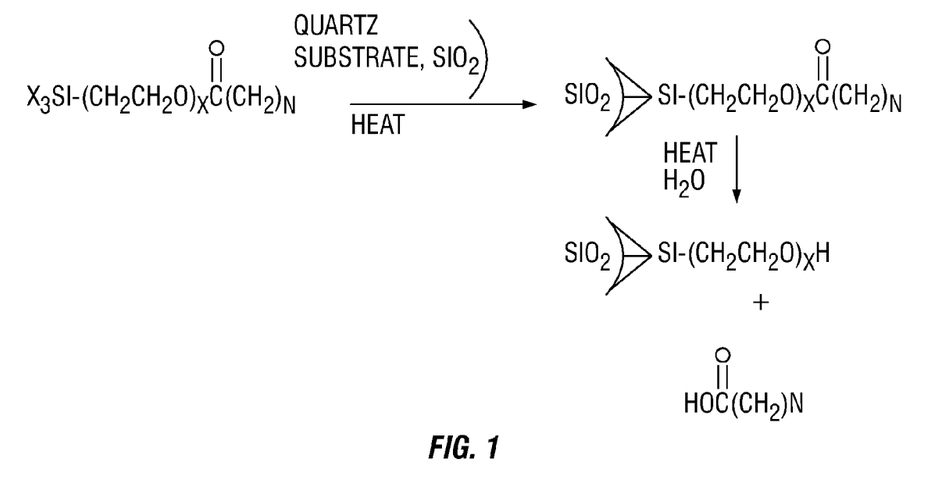
FIG. 1 is a chemical formula of an embodiment.

In FIG. 1, the terminal moiety is the hydrophobic group and the oligo(ethylene glycol) group represents the hydrophilic group. In this example, hydrolysis of the ester linkage between the two blocks will turn the initially hydrophobically-coated substrate into a hydrophilically-modified coating. Examples of suitable diblock degradable coatings may include 2-[acetoxy(polyethyleneoxy)-propyl]triethoxysilane, acetamidopropyltrimethoxysilane, N,N-dioctyl-N'-triethoxysilylpropyl urea, (3-triethyxysilylpropyl)-t-Butylcarbamate, and S-(octanoyl)mercaptopropyltriethoxysilane.

A second means to achieve degradation of the initial hydrophobic surface character is through degradation of the organosilane coating at the silane surface. That is, slow removal of the organosilane molecule could occur in such a way to remove the organosilane/organosilanol rendering a surface that behaves chemically comparable to its original uncoated character and wettability.

The fourth family of organosilanes includes silanes, occurring when R is a hydrophobic or hydrophilic group with a terminal reactive functionality, including a vinyl, sulfate, sulfonate, phosphonate, carboxylate, tertiary ammonium, or similar reactive or charged moieties.

The X-functionality in organosilanes depends on the moisture-sensitivity of the silane as imparted by the X group. Trihalosilanes are notoriously water-sensitive and when exposed to water will self-condense through equation (1), to form a polysiloxane:

$$RSiX_3 + RSiX_3 + H_2O \rightarrow 2HX + RX_2SiOSiX_2R \qquad (1)$$

However, equation (1) only depicts a condensation of 2 organosilanes and the removal of only 1 X group from each; this reaction is very favorable when X is a halogen such as chloride. Most often, all "X" leaving groups would hydrolyze similarly, possibly leading to a final R—SiO$_3$Si—R species (or larger polysiloxane oligomer). Further polycondensation will react all of the X groups of a large number of organosilanes at the same time leading to such larger polysiloxane oligomers. Because the subterranean environment is so rich in water, it is likely that this polycondensation would be too rapid and may occur prior to the organosilane reaction with the quartz or proppant substrate. However, organosilanes when X is an alkoxy or acetoxy group are much slower-reacting in self-condensation and are therefore less moisture-sensitive and are often desirable for subterranean applications. Moreover, some alkylalkoxysilanes are so moisture-insensitive that they are water-soluble and are deployed in aqueous media. The principal advantage of organosilanes for wettability-modification compared to surfactant additives is that their reaction with the SiO$_2$ substrate forms a permanent covalent bond, leading to a long-term modification of the wettability.

Methods of using coated proppants may be formed with a coating to promote faster cleanup of aqueous fracturing fluid. SiO$_2$-based sand used as a proppant in hydraulic fracturing could be coated either in commercial facilities or on the surface at the wellsite with hydrophobically modified organosilanes (including alkyltrihalosilanes (such as octadecyltrichlorosilane, OTS) or alkyltrimethoxysilane derivatives). Conversely, stable organosilanes could be injected in the carrier fluid along with the proppant and could simultaneously coat the proppant pack and the formation (through fluid leakoff). The hydrophobically-modified surface is oil-wet and as such, repels the aqueous carrier fluid. This both minimizes the ability of the (often polymeric) fracturing fluid to condense to form a filtercake directly on the proppant and encourages the aqueous fracturing fluid to efficiently flowback to the surface after the treatment.

Also, a water-wet coating on proppant particles promotes more efficient hydrocarbon production through the proppant pack. Again, hydrocarbon production through the proppant pack is more efficient when controlled wettability and repulsive forces between a preferentially water-wet proppant and the immiscible hydrocarbon phase (during production) is controlled. Siliceous surfaces such as sand, quartz, glass, and many clays are already water-wet and it would be desired to return that water-wet character after the aqueous fluid is returned to recover efficient hydrocarbon productivity.

Additionally, diblock-silane coated proppants, with degradable linkage between the blocks, as illustrated in FIG. 1, exploit the favorable properties of the variety of organosilanes described above. Diblock coated-proppants which are treated on the surface initially have a terminal hydrophobic coating to encourage efficient aqueous carrier-fluid flowback through the proppant pack and efficient proppant-carrying by the aqueous carrier-fluid. After shut in, degradation of the block-block connection, such as through an ester bond-hydrolysis, illustrated in FIG. 1, or surface degradation leads to the coating of the proppants changing to a hydrophilic coating, which promotes efficient hydrocarbon production through the pack. Note also that the reaction byproducts of the ester degradation are a carboxylic acid (could break polysaccharide gel) and an organic alcohol, which could act as a breaker for a viscoelastic surfactant (VES) carrier fluid.

Finally, some systems may benefit from adding a stable diblock silane as a solution-phase additive to a fracturing fluid. This addition act as a wettability-modifier for the formation matrix adjacent to the fracture faces, through which aqueous fluid leakoff would occur. This additive may or may not necessarily be used in conjunction with coated proppants. Water-soluble diblock organosilane forms a permanent coating on the quartz grains of the matrix adjacent to the fracture during leakoff. Here, the initial hydrophobic coating of the formation allows for fast initial unloading of aqueous fracturing fluid that has leaked off into the formation. After sufficient flowback, a extended exposure to downhole conditions such as temperature (shut in) breaks the degradable diblock linkage leaving the matrix adjacent to the propped fracture preferentially water-wet for efficient hydrocarbon production into the fracture through the lifetime of production into the fracture.

In some embodiments, the permeability through a cross section of a portion of an agglomeration of the particulate is at least about 1 percent higher than if no organosilane is present and in some additional embodiments the permeability through a cross section of a portion of an agglomeration of the particulate is about 1 percent to about 50 percent higher than if no organosilane is present. Further, in some embodiments, the conductivity through a cross section of a portion of an agglomeration of the particulate is about 1 percent to about 50 percent higher than if no organosilane is present.

In some embodiments, at least about 50 percent of the wettability modification degrades upon exposure to a pH of about 7.5 or higher after at least about 2 hours. In some additional embodiments, at least about 50 percent of the wettability modification degrades upon exposure to a temperature of about 50° C. or higher after at least about 2 hours.

EXAMPLES

The following examples are presented to illustrate the preparation and properties of fluid systems, and should not be construed to limit the scope of the invention, unless otherwise expressly indicated in the appended claims. All percentages, concentrations, ratios, parts, etc. are by weight unless otherwise noted or apparent from the context of their use.

Example 1

Figure 2:
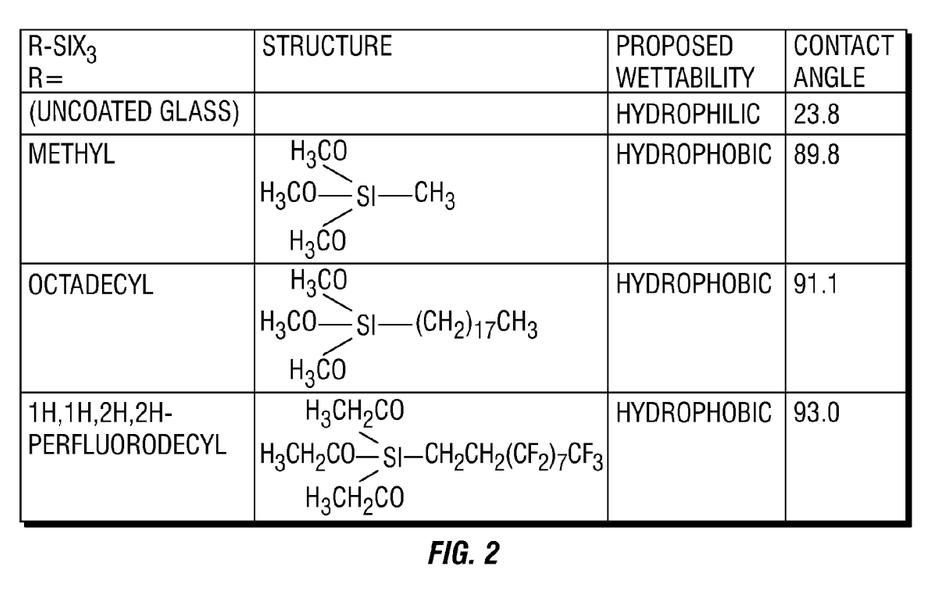
FIG. 2 is a summary chart of example 1.

See FIG. 2

Contact angle measurements were carried out using a CAM101 contact angle instrument from KSV Instruments. For each contact angle measurement, the camera was calibrated using a 4 mm calibration ball. The water used to make droplets in the contact angle experiments was deionized water. All slides used in the contact angle measurements were 1×3 cm glass slides.

Prior to contact angle measurement or prior to coating (with organosilane), uncoated glass slides were rinsed sequentially with ethyl alcohol and deionized water. The slides were then stored on their side and were cured/dried in an oven set to 75° C. overnight (at least 12 hours).

For coating slides with organosilane, dry toluene was the solvent in which deposition occurred. Prior to the coating protocol, the toluene was stored over activated 4 A molecular sieves. For the coating reaction, 300 mL of the dried toluene was combined with 2 weight percent organosilane (purchased from Sigma Aldrich or Gelest) and 1 weight percent triethylamine. The liquid components were combined and placed into a round-bottom-flask connected to a reflux-condenser. The glass slide was suspended in a wire cage fully submerged in the liquid reaction (so that no glass surfaces were flat against the flask) over a small stir-bar, stirring the reaction at 300 rpm. The reaction was maintained under a nitrogen-atmosphere (applied using laboratory nitrogen source) and the reaction was heated to reflux, greater than 112° C. for 6 hours. After the reaction, the glass slide was removed from the wire cage and was rinsed thoroughly with ethyl alcohol and water in sequence. After the rinsing protocol, the slide was cured overnight (>12 hours) in an oven at 75° C. After the overnight cure, the slide was sealed in a test tube and was stored in a dessicator.

Contact angle measurements on the coated surfaces show significantly higher contact angles to water compared to uncoated surfaces. This finding suggests that the coated surfaces are significantly more hydrophobic than the unmodified surface. The wettability of the treated-surface could be further modified through the spectrum of hydrophilicity/hydrophobicity through manipulation of the organic character in the organosilane used to treat the surface.

Example 2

Figure 3:
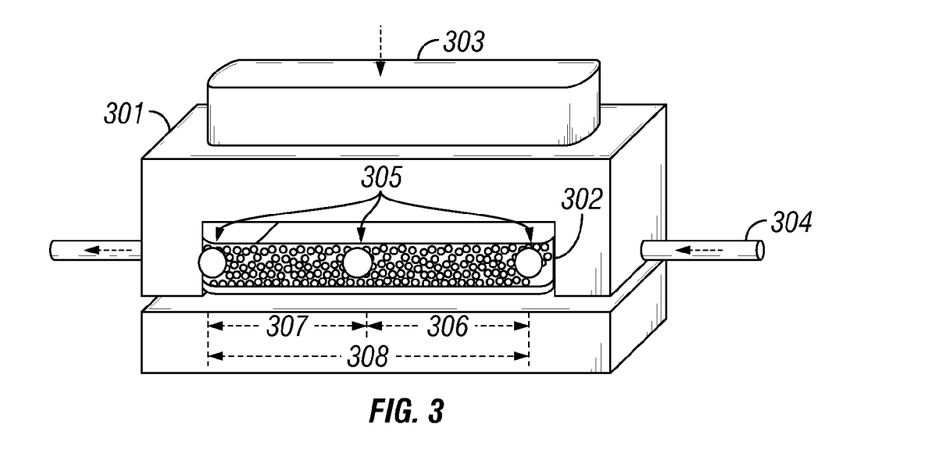
FIG. 3 is a schematic illustration of equipment used to test an sample of an additional embodiment.

See FIGS. 2 and 3

Coating protocol for the proppants used in conductivity measurements for Example 2 are very similar to those used to coat the glass slides in Example 1. The proppant used in all conductivity measurements was a 20/40-mesh size Ottawa sand sample. The same batch of sieved 20/40 Ottawa sand was used in the blank tests (uncoated proppant) and in the coating protocols.

Uncoated proppant samples were rinsed sequentially with ethyl alcohol and deionized water on a vacuum filter. The proppant samples were then stored in a jar and were cured/dried in an oven set to 75° C. overnight (at least 12 hours).

For coating the Ottawa sand samples with organosilane, dry toluene was the solvent in which deposition would occur. Prior to the coating protocol, the toluene was stored over activated 4 A molecular sieves. For the coating reaction, 200 mL of the dried toluene was combined with 2 weight percent organosilane (purchased from Sigma Aldrich or Gelest) and 1 weight percent triethylamine. The liquid components were combined and placed into a round-bottom-flask connected to a reflux-condenser. 70-80 grams of the rinsed Ottawa sand was poured into the reaction flask in addition to a stir-bar, stirring the liquid/proppant mixture at 300 rpm. The reaction was maintained under a nitrogen-atmosphere (applied using laboratory nitrogen source) and the reaction was heated to reflux greater than 112° C. for 6 hours. After the reaction, the reaction components were cooled to near room temperature. After cooling, the contents were vacuum-filtered and the proppant (caught on the filter was rinsed sequentially with more than 100 ml each of toluene, ethyl alcohol, and deionized water). After the rinsing protocol, the proppant was cured overnight (>12 hours) in an oven at 75° C. After the overnight cure, the proppant was sealed in ajar and was stored in a dessicator.

Conductivity Test

Figure 4:
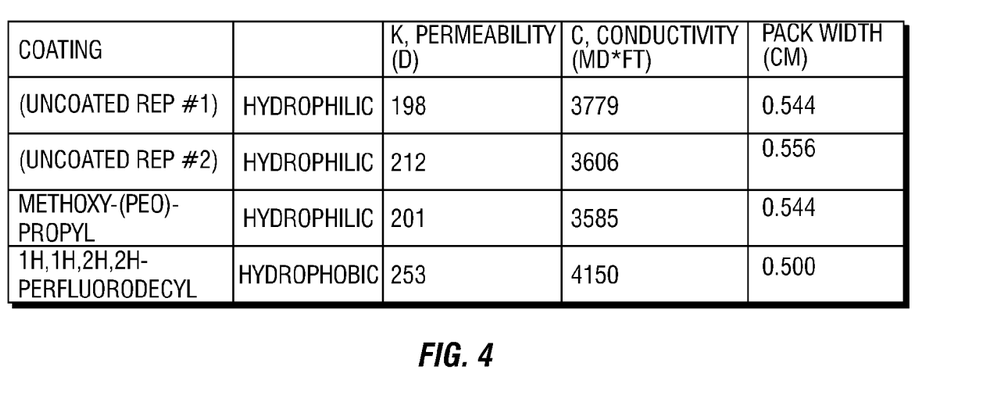
FIG. 4 illustrates Example 2 summary information including conductivity measurements using coated proppant.

See FIGS. 3 and 4

2% KCl (aq) and enough proppant to achieve 2 lb/ft$^2$ are confined against precision machined core faces 302 in a modified API conductivity cell 301. Briefly, the proppant pack undergoes overnight shut-in (shut-in at temperature & closure stress) and next day flowback (to 2% KCl solution) while being subjected to closure stresses and temperatures necessary to simulate a packed hydraulic fracture at depth. After the proppant pack is leveled and assembled in the cell 301, it is placed on the conductivity press 303. The proppant pack is placed under a minimum of 250 psig hydrostatic pressure which will remain constant throughout the test. Proppant-pack heat-up rates are selected to achieve 80% of the desired temperature increase from the ambient temperature within thirty minutes. Bottomhole static temperature will be achieved within 50 minutes of initial heat-up, which is the final test temperature. All proppant samples (uncoated or coated) used 20/40 mesh Ottawa sand (common in fracturing) as base proppant.

Once the fracture is closed, the shut-in phase is initiated. The proppant-pack will be shut-in for 12 hours at interim closure stress and final temperature. The permeability recovery phase begins with pack-width measurements, temperature conditioning of flowback fluid and injection of 2% KCl (aq) flowback fluid into the cell. Aqueous flowback is initiated at a rate of 3.00 mL/min by flowing laterally through the proppant-pack while closure stress is raised to final closure stress (3000 psi) at 100 psi/min. Permeability is monitored for cell inlet flowback. Cell inlet flow 304 will continue until steady state differential pressure measurements 305, 306, 307, 308 are attained, often at least for 2 hours. A steady state condition exists when at least ten pore volumes of cleanup fluid have flowed without a significant change in differential pressure readings. This is achieved when the permeability varies by less than 4% for a 60 minute period. Experiments 1 and 2 were carried out at 175° F., closure stress of 3000 psi, and back pressure of 250 psi.

Experimental parameters for Example 2:
Temperature: 175° F.

Closure Stress: 3,000 psi
Flow Rate (Q): 3 mL/min
Proppant loading: 2 lb/ft2

Proppant coated with 2-[methoxy(polyethyleneoxy)propyl]-trimethoxy silane[hydrophobic] leads to similar conductivity as that of uncoated sand. Here, pack of coated-proppant (1H,1H,2H,2H-perfluorodecyl silane) with the highest deionized water-contact angle has highest conductivity in a series of sand-blank experiments.

The conductivity and permeability measurements in FIG. 4 illustrate several trends. The proppant sample coated with 2-[methoxy(polyethyleneoxy)propyl]-trimethoxy silane shows very similar permeability and conductivity (under comparable conditions) to 2% KCl aqueous solution as uncoated sand. This indicates that the coating imparts a comparable hydrophilicity as the unmodified proppant or that the coating has degraded after exposure to the shut-in conditions at temperature and yields an unmodified proppant surface. In comparison, the hydrophobically-modified proppant coated with 1H,H,2H,2H-perfluorodecyltriethoxysilane yields significantly higher permeability and conductivity to 2% KCl (aq). This improved permeability can be attributed to the hydrophobic surface and resulting lower capillary pressure in the hydrophobic proppant. These results can be extrapolated to field scenarios, where the hydrophobic (perfluorodecyl) coatings could impart higher pack-permeability to facilitate recovery of any injected aqueous fluids.

Example 3

See FIGS. 5-10

In this set of experiments, samples of coated proppants were aged in solutions of water at the specified pH values and the specified temperatures. These experiments were carried out to qualify the degradation behavior of a number of coatings that were prepared on proppant samples per the preparation described in Example 2. Periodically, samples of the coated solid were taken out of the varied-pH solutions and were analyzed with DRIFTS spectroscopy. The spectra were obtained on a Nicolet NEXUS FTIR spectrometer with a DRIFTS accessory (Manufactured by Thermo Electron Corporation). A portion of the DRIFTS spectrum attributable to alkyl stretches (2923 cm$^{-1}$) of the organic chain of the organosilane coating was observed and the changes in peak area are attributed to coating degradation.

Figure 5:
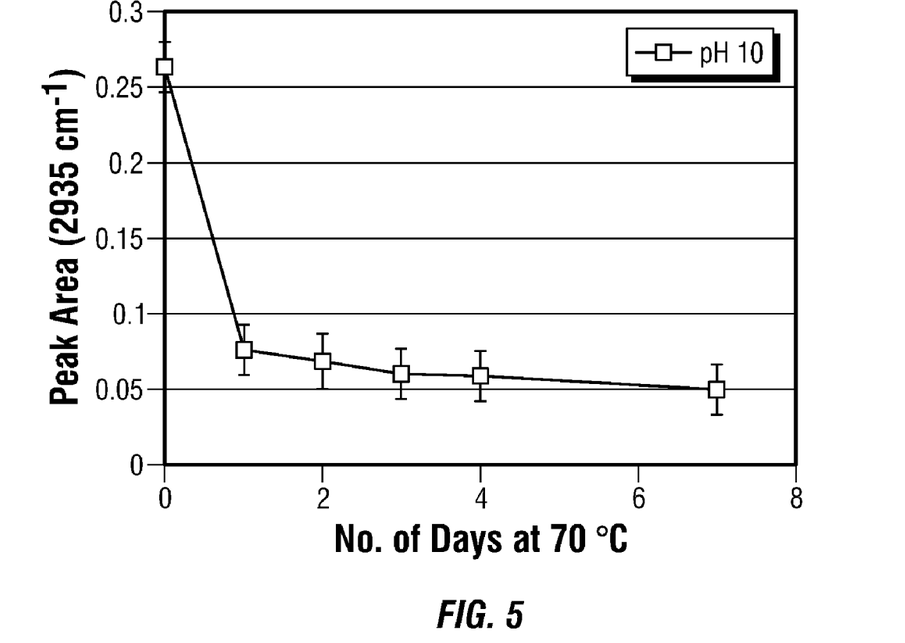
FIG. 5 is a plot of peak area as a function of days of an additional embodiment.

FIG. 5 is a plot of peak area as a function of days of an additional embodiment. The proppant used was coated with 3-aminopropyltriethoxysilane and the sample was aged at pH 10 at a temperature of 70° C. This hydrophilic coating (whose hydrophilicity is imparted by the amino moiety) undergoes rapid degradation at this moderate temperature and high pH.

Figure 6:
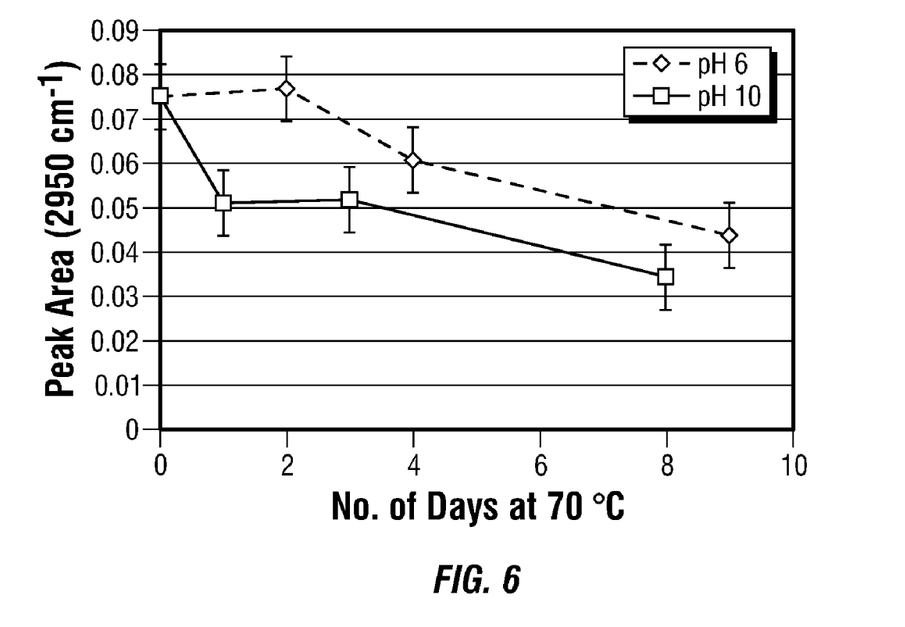
FIG. 6 is a plot of peak area as a function of days of an additional embodiment.

FIG. 6 is a plot of peak area as a function of days of an additional embodiment. The proppant used was coated with 2-[methoxy-(polyethyleneoxy)propyl]-trimethoxysilane and the samples of coated proppant were aged at 70° C. in pH 6 and pH 10 solutions. This coating undergoes rapid degradation at both moderate and high pH and a temperature of about 70° C.

Figure 7:
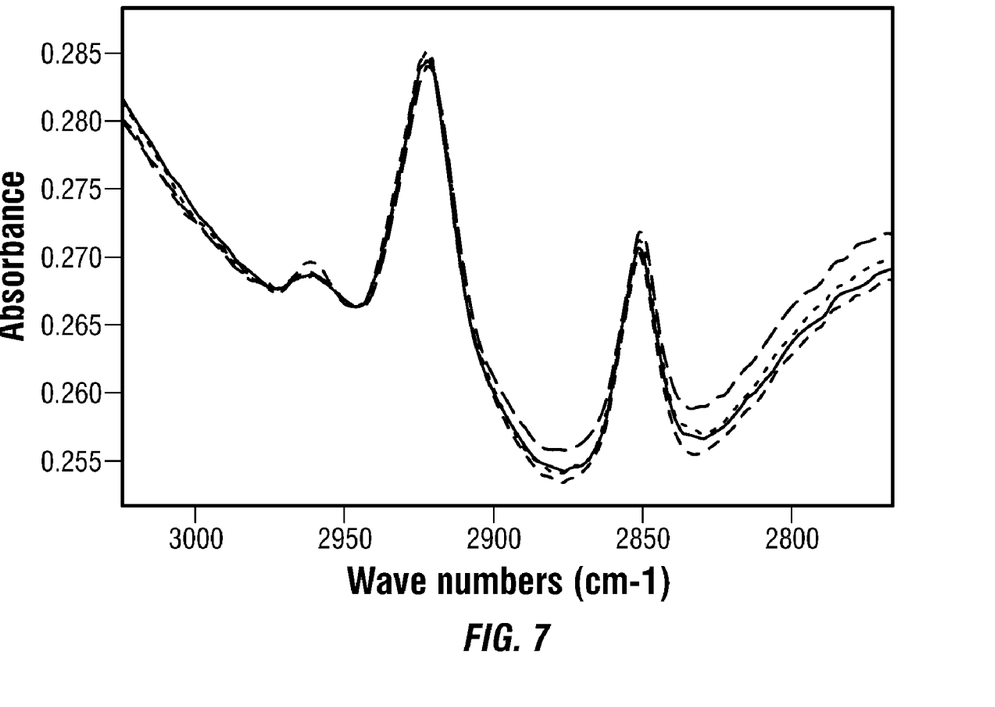
FIG. 7 is a plot of absorbance as a function of a wavenumber of an additional embodiment.
Figure 8:
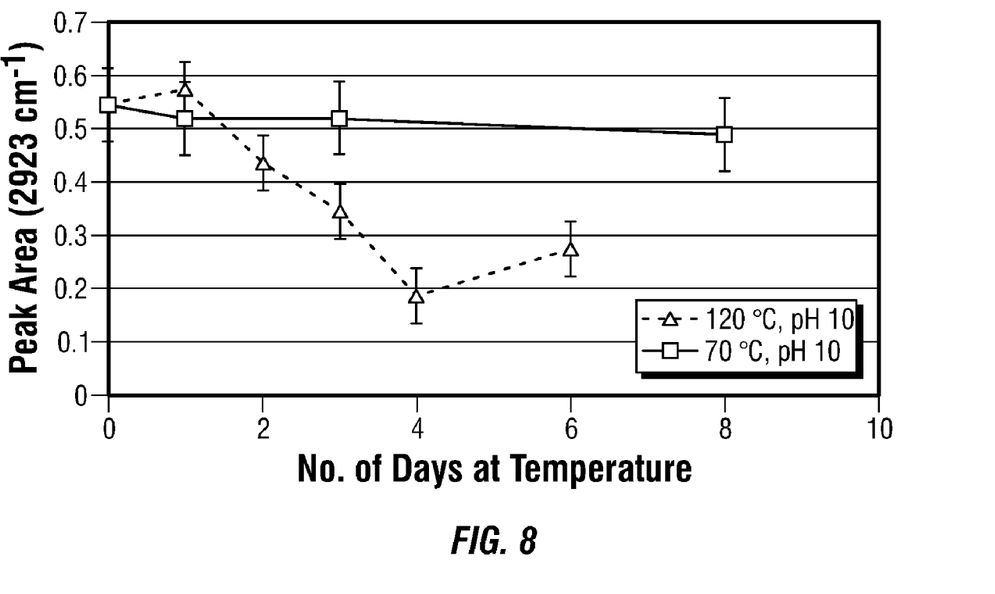
FIG. 8 is a plot of peak area as a function of days of an additional embodiment.

FIG. 7 is a plot of various DRIFTS spectra of the octadecyltrimethoxysilane-coated proppant (aged at pH 10 at 70° C. for varied periods of time) as a function of a wavenumber of an additional embodiment as illustrated by FIG. 8. The presence of peak area at 2923 cm$^{-1}$ indicates the presence of $CH_2$ groups on the proppant surface. In the current invention, this is imparted by the formation of a stable organosilane monolayer on the proppant surface. The persistence of the peak heights and peak area at 2923 cm$^{-1}$ indicates that the coating is resistant to hydrolysis at this temperature and pH condition for extended periods of time.

FIG. 8 is a plot of peak area as a function of days of an additional embodiment. The proppant used was coated with octadecyltrimethoxysilane. These samples were held at 120° C. and 70° C. and a pH of about 10. The data in FIG. 7 was used to plot the trace of peak area here at 70° C. This coating, while hydrophobic, does undergo degradation only at the high temperature (120° C.) at this pH.

Figure 9:
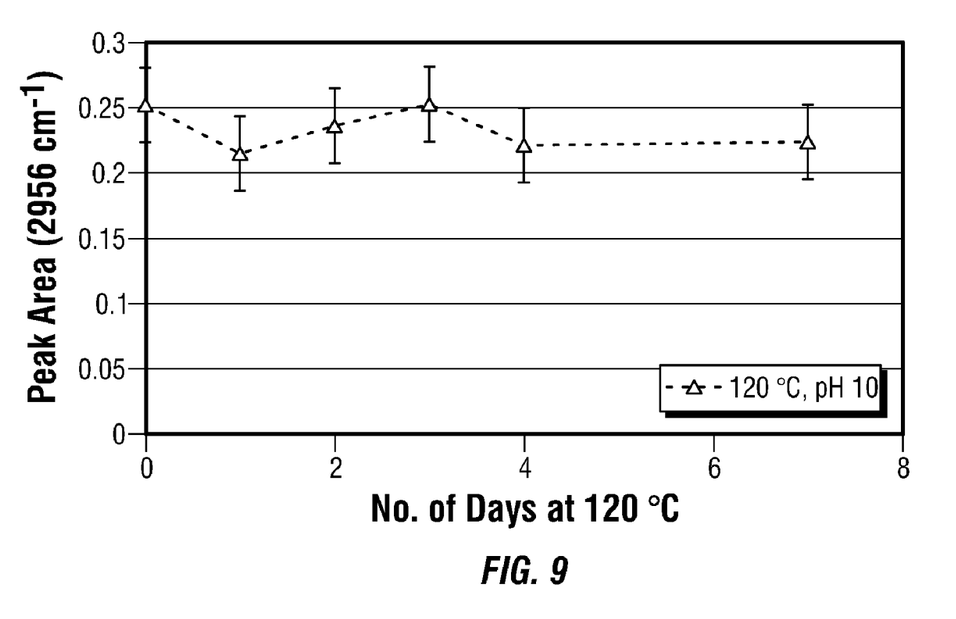
FIG. 9 is a plot of peak area as a function of days of an additional embodiment.

FIG. 9 is a plot of peak area as a function of days of an additional embodiment. The proppant used was coated with 1H,1H,2H,2H-perfluorodecyltriethoxysilane. This hydrophobic coating undergoes slow if any degradation at these aggressive conditions of high temperature and high pH.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about A to about B," or, equivalently, "from approximately A to B," or, equivalently, "from approximately A-B") disclosed herein is to be understood as referring to the power set (the set of all subsets) of the respective range of values. Accordingly, the protection sought herein is as set forth in the claims below.

We claim:

1. A method for treating a subterranean formation with a fluid, comprising:
   forming a fluid comprising a particulate and an organosilane;
   introducing the fluid into a subterranean formation with exposed surfaces; and
   modifying the wettability of the particulate or surfaces or both,
wherein the wettability modification degrades.

2. The method of claim 1, wherein the particulate is coated by the organosilane.

3. The method of claim 1, wherein the particulate has an organosilane coating prior to injection downhole.

4. The method of claim 1, wherein at least about 50 percent of the wettability modification degrades upon exposure to a pH of about 7.5 or higher after at least about 2 hours.

5. The method of claim 1, wherein at least about 50 percent of the wettability modification degrades upon exposure to a temperature of about 50° C. or higher after at least about 2 hours.

6. The method of claim 1, wherein the organosilane is methyltrimethoxysilane, hexyltrimethoxysilane, heptyltrimethoxysilane, octadecyltrimethoxysilane propylmethyldimethoxysilane, propyldimethylmethoxysilane, trimethylmethoxysilane, isooctyltrimethoxysilane, cyclohexyltrimethoxysilane, phenylethtrimethoxysilane, benzyltriethoxysilane, p-tolyltrimethoxysilane, 1H,1H,2H,2H-perfluorodecyltrimethoxysilane, nonafluorohexyltrimethoxysilane, 3,3,3-trifluoropropyltrimethoxysilane, 2-cyanoethyltrimethoxysilane, Bis[(3-methyldimethoxysilyl)propyl]-polypropylene oxide, 2-[methoxy(polyethyleneoxy)propyl[-trimethoxysilane, Bis[N,N'-(triethoxysilylpropyl)aminocarbonyl]polyethylene oxide, Bis(2-hydroxyethyl)-3-aminopropyltriethoxysilane, N-(3-triethoxysilylpropyl)gluconamide, N-(triethoxysilylproppyl)-O-polyethylene oxide urethane, carboxyethylsilanetriol, octadeculdimethyl(3-trimethoxysilylpropyl)ammonium chloride, 3-trihydroxysilylpropylmethylphosphonate, 2-[acetoxy(polyethyleneoxy)-propyl]triethoxysilane, acetamidopropyltrimethoxysilane, N,N-dioctyl-N'-triethoxysilylpropyl urea, (3-triethyxysilylpropyl)-t-Butylcarbamate, S-(octanoyl)mercaptopropyltriethoxysilane, or a combination thereof.

7. The method of claim 1, wherein the organosilane bears a functional group that comprises a linear alkane, branched alkane, polymeric alkane, oligo(ethylene glycol), oligo(propylene glycol), vinyl, sulfate, sulfonate, phosphonate, carboxylate, tertiary ammonium, or a combination thereof.

8. A method of treating a subterranean formation with a fluid, comprising:
   forming a fluid comprising a particulate and an organosilane with the chemical formula $R_nSiX_{4-n}$, wherein n is equal to 1, 2, or 3, R is an organic functional group, and X is a halogen, alkoxy, or acetoxy group;
   introducing the fluid into a subterranean formation with exposed surfaces;
   modifying the wettability of a surface of the particulate or the subterranean formation or both; and
   degrading at least a portion of the wettability modification of the particulate or surface or both.

9. The method of claim 8, wherein the permeability to aqueous fluid through a cross section of a portion of an agglomeration of the particulate is at least about 1 percent higher than if no organosilane is present.

10. The method of claim 8, wherein the permeability to aqueous fluid through a cross section of a portion of an agglomeration of the particulate is about 1 percent to about 50 percent higher than if no organosilane is present.

11. The method of claim 8, wherein the conductivity to aqueous fluid through a cross section of a portion of an agglomeration of the particulate is about 1 percent to about 50 percent higher than if no organosilane is present.

12. The method of claim 8, wherein a surface of the particulate or formation or both is more hydrophobic than if no organosilane were present.

13. The method of claim 8, wherein a surface of the particulate or formation or both is more or comparably hydrophilic than if no organosilane were present.

14. The method of claim 8, wherein the particulate is proppant, fiber, gravel, colloidal silica, siliceous materials, or a combination thereof.

15. The method of claim 8, wherein the particulate is coated by the organosilane.

16. The method of claim 8, wherein the particulate has an organosilane coating before introducing the fluid into a subterranean formation with exposed surfaces.

17. The method of claim 8, wherein the organosilane bears a functional group that comprises a linear alkane, branched alkane, polymeric alkane, oligo(ethylene glycol), oligo(propylene glycol), vinyl, sulfate, sulfonate, phosphonate, carboxylate, tertiary ammonium, or a combination thereof.

18. The method of claim 8, wherein the organosilane is methyltrimethoxysilane, hexyltrimethoxysilane, heptyltrimethoxysilane, octadecyltrimethoxysilane propylmethyldimethoxysilane, propyldimethylmethoxysilane, trimethylmethoxysilane, isooctyltrimethoxysilane, cyclohexyltrimethoxysilane, phenylethtrimethoxysilane, benzyltriethoxysilane, p-tolyltrimethoxysilane, 1H,1H,2H,2H-perfluorodecyltrimethoxysilane, nonafluorohexyltrimethoxysilane, 3,3,3-trifluoropropyltrimethoxysilane, 2-cyanoethyltrimethoxysilane, Bis[(3-methyldimethoxysilyl)propyl]-polypropylene oxide, 2-[methoxy(polyethyleneoxy)propyl[-trimethoxysilane, Bis[N,N'-(triethoxysilylpropyl)aminocarbonyl]polyethylene oxide, Bis(2-hydroxyethyl)-3-aminopropyltriethoxysilane, N-(3-triethoxysilylpropyl)gluconamide, N-(triethoxysilylproppyl)-O-polyethylene oxide urethane, carboxyethylsilanetriol, octadeculdimethyl(3-trimethoxysilylpropyl)ammonium chloride, 3-trihydroxysilylpropylmethylphosphonate, 2-[acetoxy(polyethyleneoxy)-propyl]triethoxysilane, acetamidopropyltrimethoxysilane, N,N-dioctyl-N'-triethoxysilylpropyl urea, (3-triethyxysilylpropyl)-t-Butylcarbamate, S-(octanoyl)mercaptopropyltriethoxysilane, or a combination thereof.

19. The method of claim 8, further comprising gravel packing, hydraulic fracturing, or acid fracturing.

20. A method of producing hydrocarbon from a subterranean formation, comprising:
   providing a wellbore in a subterranean formation;
   forming a fluid comprising a particulate and an organosilane with the chemical formula $R_nSiX_{4-n}$, wherein n is equal to 1, 2, or 3, R is an organic functional group, and X is a halogen, alkoxy, or acetoxy group;
   introducing the fluid into the subterranean formation with exposed surfaces;
   modifying the wettability of a surface of the particulate or the subterranean formation or both;
   producing hydrocarbon from the wellbore in the subterranean formation; and
   degrading at least a portion of the wettability modification of the particulate or surface or both.

* * * * *